J. TOMLINSON.
Tire-Benders.
No. 135,498. Patented Feb. 4, 1873.
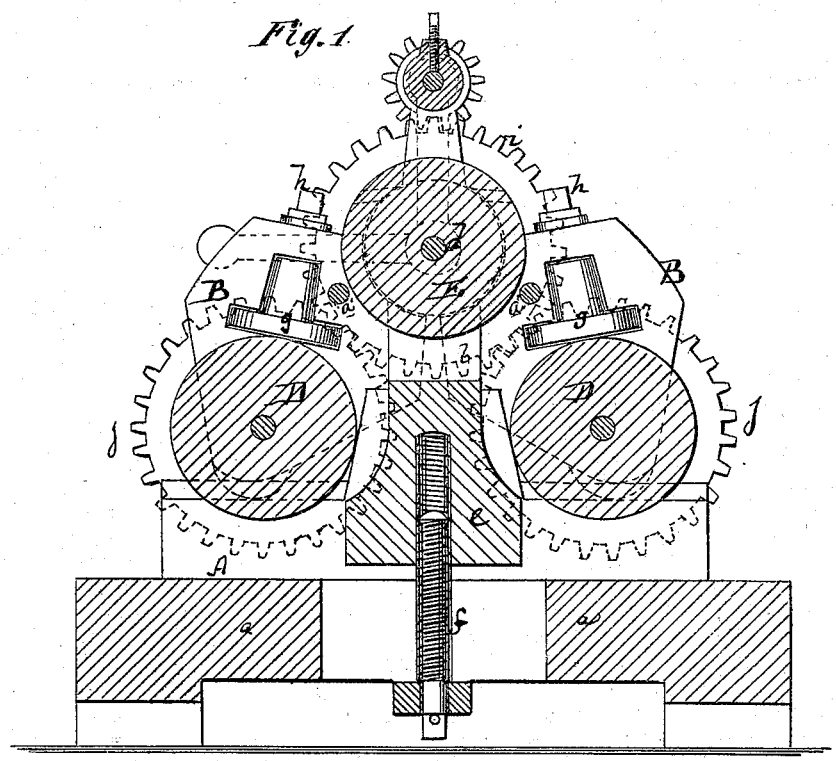
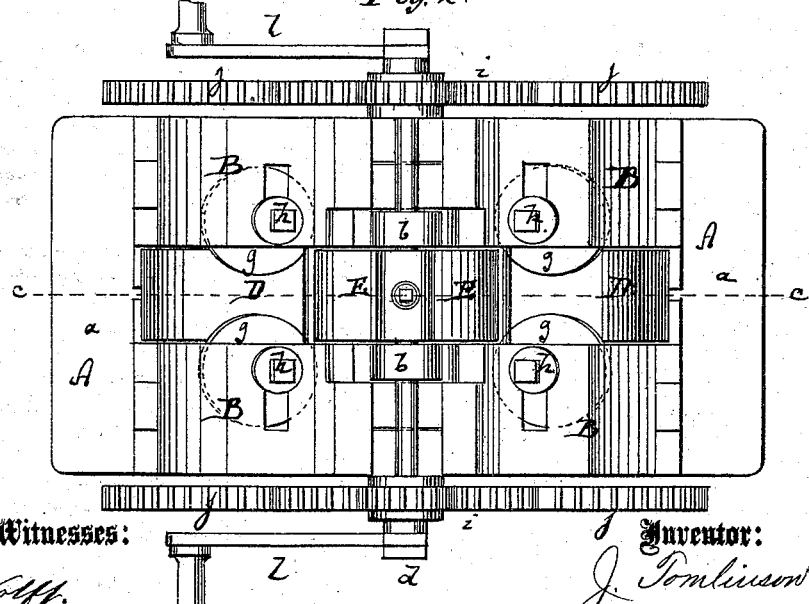

UNITED STATES PATENT OFFICE.

JOSEPH TOMLINSON, OF ONSLOW, IOWA.

IMPROVEMENT IN TIRE-BENDERS.

Specification forming part of Letters Patent No. 135,498, dated February 4, 1873.

*To all whom it may concern:*

Be it known that I, JOSEPH TOMLINSON, of Onslow, in the county of Jones and State of Iowa, have invented a new and Improved Tire-Bender, of which the following is a specification:

Figure 1 is a vertical longitudinal section of my improved tire-bender on the line $c\ c$, Fig. 2, indicating the plane of section. Fig. 2 is a plan or top view of the same.

Similar letters of reference indicate corresponding parts.

This invention relates to a new apparatus for bending wagon-tires, and has for its object to permit in one machine the production of suitable circles to fit all sizes of wheels. The invention consists in constructing the tire-bender of three rollers, which are adjustable toward each other, in order to vary the size of the circles in which the tire is bent in passing between them. The invention also consists in the application of lateral rotary guides which can be adjusted to fit tires of suitable width and to properly guide the same while passing through the machine.

In the accompanying drawing, the letter A represents the frame of my machine. This frame consists of the base $a$ and of two posts, $b\ b$, which project from the base. In these two posts is hung or secured a horizontal pin, $d$, on which are hinged four movable cheeks, B B, two being on each side of the machine. The cheek-pieces are connected by the rods $a'\ a'$, Fig. 1, which prevent their spreading apart when a tire is being bent or upset. D D are two rollers, hung respectively in the two pairs of cheeks B B that are on the opposite sides of the posts. E is a third roller, similar in size to the rollers D D, and hung on the pin $d$, between the posts $b\ b$. These posts $b\ b$ are connected at their lower ends by a cross-piece, $e$, which is, by a screw, $f$, united to the base $a$, and are prevented from spreading apart or from approaching each other at their upper ends, mainly by means of the cheek-pieces B B, shaft $d$, and roller E. By means of the screw $f$ the posts, cheeks, and all other appendages can be adjusted up or down to any suitable degree, according to the extent of said screw. The lower ends of the cheeks B rest upon rails, projections, or other devices that are formed on the surface of the base $a$, and serve therefore, whenever the posts $b$ or their appendages are raised, to more or less draw the two rollers D D together, while the more such posts $b$ are drawn down the more will the cheeks B be swung apart and the rollers D D separated. As the tire to be bent is drawn through between the three rollers to come under the roller E and over the rollers D D, it is evident that the more the rollers D D are spread apart the smaller will be the circle formed on the tire, while a circle of larger diameter will be produced whenever the rollers D D are brought nearer together—that is to say, elevated more, toward the roller E. In the cheek-pieces B B are hung friction-rollers $g\ g$, with the edges of which the edges of the tire come in contact. The arbors $h$ of these friction-rollers $g\ g$ fit in transverse slots of the cheek-pieces B B, in the manner clearly shown in Fig. 2, so that they are laterally adjustable, which allows the friction-rollers to be set more or less far apart to admit bands of suitable width. The end of the pin $d$ carries a cog-wheel, $i$, which is in gear with cog-wheels $j\ j$ that are hung upon the ends of the rollers D D respectively, so that all three rollers will simultaneously revolve whenever the pin $d$ is rotated by a crank-handle, $l$, or other means.

This arrangement of cog-wheels and crank-handle, &c., may be applied at either end of the machine, as indicated in Fig. 2.

Having thus described my invention, I claim as new and desire to secure by Letters Patent—

1. The tire-bender composed of the hinged cheek-pieces B B, adjustable rollers D D, and movable roller E, all arranged in respect to each other as herein shown and described.

2. The subject-matter of the foregoing clause, in combination with the movable posts $b\ b$ and screw $f$, for adjusting the instrument to produce circles of suitable size, as specified.

3. The laterally-adjustable rollers $g\ g$ arranged in the hinged cheek-pieces B B of a tire-bender, substantially as herein shown and described.

JOSEPH TOMLINSON.

Witnesses:
 JAMES W. BATTLES,
 CHAS. E. SPURR.